Patented June 8, 1943

2,321,316

UNITED STATES PATENT OFFICE 2,321,316

PRINTING INK COMPRISING CELLULOSE DERIVATIVES

Norman R. Peterson and Joseph L. Sherk, Midland, Mich., assignors to The Dow Chemical Company, Midland, Mich., a corporation of Michigan No Drawing. Application May 17, 1941,
Serial No. 393,940

6 Claims. (Cl. 106—26)

This invention relates to printing inks of the so-called solvent type which have as part of their film forming base a dissolved cellulose ether.

It is an object of the present invention to provide a solvent type printing ink which may be used in the same manner as are the common oil base inks and on the same type of press which normally employs oil base inks. Another object is to provide a solvent type printing ink adapted for use in the high speed printing processes wherein the printed matter is dried by brief exposure to elevated temperatures. Yet another object is the provision of inks useful for printing both on fibrous surfaces such as those of paper, and on smooth non-fibrous surfaces such as are presented by thermoplastic sheets including those of the cellulose derivatives and the vinyl type of polymers.

The foregoing and related objects may be attained according to the invention through the employment of a printing ink whereof the vehicle is a lacquer comprising as a solute a cellulose ether soluble in organic solvents, and as the solvent a mixture of a particular type of high boiling ether alcohol and a particular type of high boiling hydrocarbon of classes and in proportions to be detailed hereinafter.

The ether alcohol to be employed in the new ink has the general formula

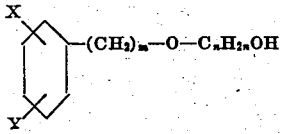

wherein X and Y are each independently selected from the class consisting of alkyl radicals and hydrogen, X and Y together containing not to exceed 6 carbon atoms, $m$ has one of the values 0, 1, and 2, and $n$ is an integer from 2 to 5, inclusive. The hydrocarbon component of the solvent must be strongly aromatic in character, and, according to the present invention, is an alkyl substituted naphthalene containing not more than two alkyl substituents having a total of not more than 6 carbon atoms.

The cellulose ether employed as the solute in the new ink may be ethyl cellulose, butyl cellulose, benzyl cellulose, or the like, of a degree of substitution such that it is capable of being dissolved in organic solvents. For simplicity such cellulose ethers may be designated herein as "organo-soluble" cellulose ethers.

The alcohols whose formula is given above are typified by phenoxy ethanol, benzyloxy ethanol, phenyl-ethoxy ethanol, phenoxy propanol, monoethyl phenoxy ethanol, diethyl phenoxy ethanol, paratertiary butyl phenoxy ethanol, and the like.

Examples of the hydrocarbon component of the solvents which have been found particularly useful are mono and diethyl naphthalenes, mono butyl naphthalene, ethyl butyl naphthalene, monoamyl naphthalene, and the like.

Among the properties which are desired in the solvent type of printing ink is that of high flow at room temperature combined with low volatility of the fluid constituents. The solvents here employed all have the required low volatility, being much less volatile than other solvents which have been proposed for use in this type of ink including, for example, the monobutyl ether of diethylene glycol. It has also been found that the present compositions have the required high rate of flow which permits them to spread evenly on the inking rolls or platen. The solvents employed in the present compositions all have boiling points above 240° C. and the preferred compositions to be described hereinafter all have rates of flow measured at room temperature of at least 7 inches in 15 minutes, in a comparative test which has been found convenient and which also will be described in connection with the examples.

The following examples illustrate the invention.

EXAMPLE 1

White printing ink

| | Parts by weight |
|---|---|
| Ethyl cellulose, 7 C. P. S. 49% ethoxy | 50 |
| Beckolin | 100 |
| Zitro | 50 |
| Ethyl naphthalene | 120 |
| Phenoxy ethanol | 120 |
| Titanium dioxide | 600 |
| 6% cobalt naphthenate | 1 |

NOTE.—Zitro is zinc rosinate. Beckolin is a long oil alkyd resin. The 7 centipoise ethyl cellulose represents the lowest viscosity grade available at the time of the test.

The ink was made by dissolving the ethyl cellulose, Beckolin, and Zitro in the two solvent components and milling in the pigment and drier. The ink printed satisfactorily on paper, drying almost immediately to a non-smudging state due to the rapid penetration into the paper. The ink was also employed in printing on ethyl cellulose film and it was observed that the solvent was rapidly absorbed by the film and that slip-sheets were not required, especially when a press heater was employed.

EXAMPLE 2

To illustrate the high degree of flow obtained when using the preferred solvent mixture for use in the lacquer of the invention, a number of solutions containing 25 per cent by weight of the lowest available viscosity type of organo-soluble ethyl cellulose and varying proportions of a number of different high boiling hydrocarbons and alcohols were prepared. Each of the test solutions was placed in a semi-spherical depression in the upper surface of a flat polished steel plate and the plate was tilted to an angle of 60° from the horizontal so that the solutions flowed from the depressions toward the opposite end of the plate. The distance each solution flowed during 15 minutes was taken as a measure of its rate of flow and hence of its viscosity. The results for some of the tested compositions are set forth in the following table.

TABLE

| Per cent alcohol | 0 | 10 | 20 | 30 | 40 | 50 | 60 | 70 | 80 | 90 | 100 |
|---|---|---|---|---|---|---|---|---|---|---|---|
| Per cent hydrocarbon | 100 | 90 | 80 | 70 | 60 | 50 | 40 | 30 | 20 | 10 | 0 |
| A | 2 | 4.3 | 8.2 | 10.8 | 9.2 | 8.6 | 8 | 7.5 | 7.1 | 6.8 | 6.5 |
| B | 1.6 | 3.5 | 7.4 | 9 | 9 | 8.3 | 7.6 | 7.1 | 6.3 | 5.6 | 5 |

A = ethyl naphthalene + benzyloxy ethanol.
B = ethyl naphthalene + phenoxy ethanol.

Similar tests to those reported were made with other lacquers including those wherein the alcohol component was p-ethyl benzyloxy ethanol, p-tertiary butyl phenoxy ethanol, phenyl-ethoxy ethanol, iso-propyl phenoxy ethanol, p-tertiary amyl phenoxy ethanol, n-hexyl phenoxy ethanol, phenoxy propanol, phenoxy butanol, and the like, and the hydrocarbon component was dimethyl naphthalene, monobutyl naphthalene, monoamyl naphthalene, ethyl butyl naphthalene, and the like. In each case the mixed solvent contributed greater flow than was possible with either one alone, and maximum flow was obtained when the solvent contained from 15 to 70 per cent of the alcohol and correspondingly from 85 to 30 per cent of the hydrocarbon. Preferred compositions contain from 20 to 55 per cent of the alcohol and from 80 to 45 per cent of the hydrocarbon. The flow relationships were found to hold when the tested lacquers were compounded with resins, pigments and like ink ingredients to make printing inks. It was also found that these inks all had the property of being very rapidly absorbed into paper or by films of such thermoplastics as ethyl cellulose and the vinyl chloride-vinyl acetate copolymer known commercially as Vinylite, for example.

The herein-claimed inks all retain their fluidity on the rolls or platen of a press for a period comparable with the customary drying oil inks, and for a much longer time than inks of the solvent type heretofore available.

We claim:

1. A solvent type of printing ink comprising a pigment and a vehicle, said vehicle being a lacquer comprising, as a solute, an organo-soluble cellulose ether, and, as a solvent, a mixture of from 85 to 30 per cent of an alkyl substituted naphthalene containing from 1 to 2 alkyl groups having a total of not to exceed 6 carbon atoms, and, correspondingly from 15 to 70 per cent of an ether alcohol having the general formula

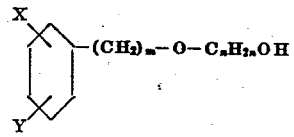

wherein X and Y are each independently selected from the class consisting of alkyl radicals and hydrogen, X and Y together containing not to exceed 6 carbon atoms, $m$ has one of the values 0, 1, and 2, and $n$ is an integer from 2 to 5, inclusive.

2. A solvent type of printing ink comprising a pigment and a vehicle, said vehicle being a lacquer comprising, as a solute, an organic-soluble cellulose ether, and, as a solvent, a mixture of from 80 to 45 per cent of an alkyl substituted naphthalene containing from 1 to 2 alkyl groups having a total of not to exceed 6 carbon atoms, and correspondingly, from 20 to 55 per cent of an ether alcohol having the general formula

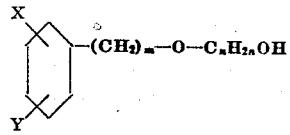

wherein X and Y are each independently selected from the class consisting of alkyl radicals and hydrogen, X and Y together containing not to exceed 6 carbon atoms, $m$ has one of the values 0, 1, and 2, and $n$ is an integer from 2 to 5, inclusive.

3. A solvent type of printing ink comprising a pigment and a vehicle, said vehicle being a lacquer comprising, as a solute, ethyl cellulose, and, as a solvent, a mixture of from 85 to 30 per cent of an ethyl naphthalene and correspondingly from 15 to 70 per cent of phenoxy ethanol.

4. A solvent type of printing ink comprising a pigment and a vehicle, said vehicle being a lacquer comprising, as a solute, ethyl cellulose, and, as a solvent, a mixture of from 80 to 45 per cent of an ethyl naphthalene and correspondingly from 20 to 55 per cent of phenoxy ethanol.

5. A solvent type of printing ink comprising a pigment and a vehicle, said vehicle being a lacquer comprising, as a solute, ethyl cellulose, and, as a solvent, a mixture of from 85 to 30 per cent of an ethyl napthalene and correspondingly from 15 to 70 per cent of benzyloxy ethanol.

6. A solvent type of printing ink comprising a pigment and a vehicle, said vehicle being a lacquer comprising, as a solute, ethyl cellulose, and, as a solvent, a mixture of from 80 to 45 per cent of an ethyl naphthalene and correspondingly from 20 to 55 per cent of benzyloxy ethanol.

NORMAN R. PETERSON.
JOSEPH L. SHERK.